United States Patent [19] [11] 4,258,236
Conklin et al. [45] Mar. 24, 1981

[54] REMOTE TELEPHONE LINE SWITCHING AND TESTING

[75] Inventors: Charles E. Conklin, Pleasant Valley; Duncan Bruce, Renssalaer, both of N.Y.

[73] Assignee: Conklin Instrument Corporation, Pleasant Valley, N.Y.

[21] Appl. No.: 27,138

[22] Filed: Apr. 4, 1979

[51] Int. Cl.³ .................. H04B 3/46; H04M 3/26
[52] U.S. Cl. .................. 179/175.3 R; 179/175.2 R
[58] Field of Search ............ 179/175.1 R, 175.2 R, 179/175.2 C, 175.3 R, 175.3 F

[56] References Cited

U.S. PATENT DOCUMENTS

| 3,919,504 | 11/1975 | Crosley et al. | 179/175.2 R |
| 4,029,913 | 6/1977 | Gunderson | 179/175.3 R |
| 4,112,264 | 9/1978 | Abramson et al. | 179/175.3 R |

Primary Examiner—Thomas A. Robinson
Attorney, Agent, or Firm—Sughrue, Rothwell, Mion, Zinn and Macpeak

[57] ABSTRACT

Apparatus for remote switching and testing of a four-wire telephone line system is disclosed. The telephone line provides four-wire service between a first location and one or more second remote locations. The switching and testing apparatus provides the capability at the first location of controlling switching circuits at the remote location and making tests of the telephone line system including customer installed equipment. The telephone line, which will include a dedicated transmission path through at least one telephone company central office, is terminated at the respective customer premises by a terminating unit which provides a connection of customer installed equipment to the four-wire line. The customer installed equipment at one of the remote customer premises may include a plurality of modems which are connected to the four-wire lines by means of a distribution bridge and collection bridge pair, also known as a split data bridge, which serves to branch the four-wire line into a plurality of channels connected to the modems. Each channel can be provided with a tone activated detection circuit which may be separately addressed by a multi-frequency tone generator at the first customer premise. This tone activated detection circuit controls switching circuits to provide loop-back related tests such as conventional four-wire loop-back, data-streaming dropout or quiet termination, and a milliwatt test signal source in a predetermined sequence on command. Thus, each channel can be individually addressed, tested and dropped or returned to service as appropriate, all on command from the first location.

16 Claims, 2 Drawing Figures

REMOTE TELEPHONE LINE SWITCHING AND TESTING

BACKGROUND OF THE INVENTION

The present invention generally relates to remote telephone switching and testing and, more particularly, to apparatus which provides a customer who leases a private telephone line from a telephone company with circuit test capability independent of telephone company provided service.

Private telephone lines are leased from the telephone company to provide data transmission or the like between a first customer premise and one or more second remote customer premises. The private telephone line is classified as voice grade four-wire service, the four wires being a receive pair (tip and ring) and a transmit pair (tip and ring). This four-wire service passes through at least one telephone company central office, and at each customer premise, a terminating unit terminates the respective four-wire line and provides a connection to customer installed equipment.

Telephone company service and maintenance frequently does not extend beyond the terminating units for the four-wire lines at each of the customer premises. This telephone company service includes certain tests which are routinely performed or performed for diagnostic purposes. Typically, the terminating units at the customer premises are provided with loop-back test circuits which are responsive to a tone having a frequency of 2713 Hz. This tone is generated at the telephone company central office, and when it is received by the loop-back test circuit at one of the terminating units, the loop-back test circuits function to simultaneously disconnect customer equipment and provide a connection from the receive tip to the transmit tip and a connection from the receive ring to the transmit ring. This connection from the receive pair to the transmit pair is made with a loop-back amplifier which raises the -16 dBm received test signals to 0 dBm providing equal level loopback. Receipt of a looped back signal at the telephone company central office provides confirmation of the loop-back condition of the four-wire line under test, thereby providing an initial continuity test. A milliwatt test signal source providing a precision 1004 Hz sinusoidal signal at 0 dBm may then be connected to the four-wire service at the telephone company central office. This signal propagates through the loop established by the loop-back condition, and the signal received back at the telephone company central office is used to test the loss, distortion and noise of the four-wire system. Once these tests have been completed, the four-wire line is returned to service by a second tone received by the loop-back test circuits which then reconnect the customer equipment to the four-wire line.

The telephone company test procedures have the advantages of being quickly performed from a central location without the need of sending a technician to the customer's premise. As a result, service disruption and expense are minimized. However, these tests are performed only on the telephone company four-wire service and do not extend beyond the terminating units on the customer's premises. Moreover, the tests are typically made only during the telephone company's regular business hours, in which case disruption could mean a loss of several hours service to the customer until the opening of the next business day.

As a specific example, consider the case where the remote customer premise includes a plurality of data collecting and/or processing equipment which are connected by means of modems (modulation and demodulation units) for connection to the telephone line. In this specific example, connection of the several modems to the four-wire line is made by means of distribution and collection bridge pairs, also known as split data bridges. This equipment may be associated with a data processing center, a manufacturing facility or the like which may itself be unmanned at least part of the time. In that case, the telephone company provided service will not test each of the several channels which connect the individual modems to the four-wire line because of inability to discriminate between channels beyond the bridge. Even if the telephone company were to provide a test of the individual channels connecting the modems to the four-wire service, the type of test normally performed by the telephone company from the central office cannot measure the two-wire sine wave return loss of the transmit channels emanating from the respective modems, without access to the remote end of those channels. Yet another problem faced by the customer is the possibility of a malfunction of one of the data collection and/or processing equipments at the remote location which results in a condition known as "data-streaming." In this condition, the equipment puts out a continuous stream of noise which is generally invalid data, but since the data stream is continuous, that equipment effectively seizes the telephone line, preventing the transmission of valid data from other equipments over the telephone line. If this condition persists, the customer may lose hours of private line service. It is therefore desirable to disconnect the malfunctioning equiment from its channel, thereby freeing the telephone line for use by the other channels. The malfunctioning equipment can then be serviced at the customer's convenience.

Since the customer is generally the first to recognize service failures, the customer should be in a position to independently test his service and ascertain the nature of service failures in terms of the parameters tested. Thus, when the customer's service call is received by the telephone company, the customer is in a position to submit test results as well as request the service, thereby expediting the return of full service to the customer. What is needed, therefore, is a remote telephone line switching and testing apparatus which will facilitate testing service between one location and at least a second remote location.

According to the invention there is provided a remote telephone line switching and testing circuit for a four-wire communication system providing communication between equipment at a first location and equipment of at least a second remote location. Typically, the four-wire communication system includes one, and sometimes more, telephone company central offices connected to the first location and the second remote location by respective four-wire lines and providing a communication path therebetween. The switching and testing circuit is adapted to be connected to the receive pair at the remote location and includes a tone detecting circuit which is responsive to tones of a predetermined frequency for providing output detection signals. A control circuit is responsive to those output detection signals to generate control signals.

According to one aspect of the invention, switching circuitry is provided which is responsive to a first control signal from the control circuit for disconnecting the equipment at the second location and providing quiet terminations for both the receive and transmit pairs of the four-wire line. This is the data-streaming dropout mode. The switching circuitry is further responsive to a second control signal from the control circuit for re-establishing the connection between the equipment at the second location and the four-wire line.

According to another aspect of the invention, switching circuitry is provided which is responsive to a first control signal from the control circuit for disconnecting the equipment at the second location from both pairs of the four-wire line and connecting a milliwatt test signal source to the transmit pair. The switching circuitry is further responsive to a second control signal from the control circuit for disconnecting the milliwatt test signal source from the transmit pair and reconnecting the equipment at the second location to the four wire line.

In the preferred embodiments of the invention, the control circuit is a sequencer circuit including a two-stage binary counter and decoding logic. In the first preferred embodiment, the counter counts three detection signals and is then automatically reset after a brief delay. On the first count output, the switching circuitry disconnects the equipment at the second location from the four-wire line and connects a loop-back amplifier between the receive pair and the transmit pair. On the second count output, the switching circuitry disconnects the loop-back amplifier and provides quiet terminations for each of the receive and transmit pairs. On the third count output, the loop-back amplifier is briefly reconnected between the receive pair and the transmit pair to provide a brief tone pulse, and thereafter the loop-back amplifier is disconnected and the equipment at the second location is reconnected to the four-wire line. At this time the counter is reset to be ready for the next cycle of switching and testing.

In the second preferred embodiment, the counter counts four detection signals, and since this count results in both stages of the counter being in their initial states, there is no need to provide a reset for the counter. On the first count output, the switching circuitry disconnects the equipment at the second location from the four-wire line and connects a loop-back amplifier between the receive pair and the transmit pair. On the second count output, the switching circuitry disconnects the loop-back amplifier and provides quiet terminations for each of the receive and transmit pairs. On the third count output, a milliwatt test signal source is connected to the transmit pair. On the fourth count output, the milliwatt test signal source is disconnected and the connection of the equipment at the second location to the four-wire line is re-established.

In the case of the specific example mentioned earlier where the second location includes a plurality of modems, a separate switching and testing circuit can be provided for each modem. Each switching and testing circuit is assigned a different predetermined tone frequency to which only its tone detecting circuit is responsive. With this arrangement, it is possible to separately address each switching and testing circuit to provide a multipoint testing capability.

The tone generator to which the tone detecting circuit is responsive can be at any convenient location which in this application will simply be referred to as the first location. Those skilled in the art will understand that this first location could be a first customer premise or any intermediate point between a first customer premise and a second remote customer premise including a telephone company central office. If the multipoint testing capability is provided, the tone generator is a multi-tone generator with any one of the predetermined tone frequencies being selectable. To prevent activation of the tone detecting circuits by data, the activating tone signal is applied nominally 10 dB higher than data level, and the tone detector sensitivity is reduced to disregard data level signals.

The invention is generally useful in any four-wire communication system and provides a flexibility in switching and testing between any pair of locations in the system not heretofore available.

BRIEF DESCRIPTION OF THE DRAWINGS

The foregoing and other aspects, advantages and objects of the invention will be better appreciated from the following detailed description taken together with the accompanying drawings, in which.

DESCRIPTION OF THE PREFERRED EMBODIMENTS

Figure 1:
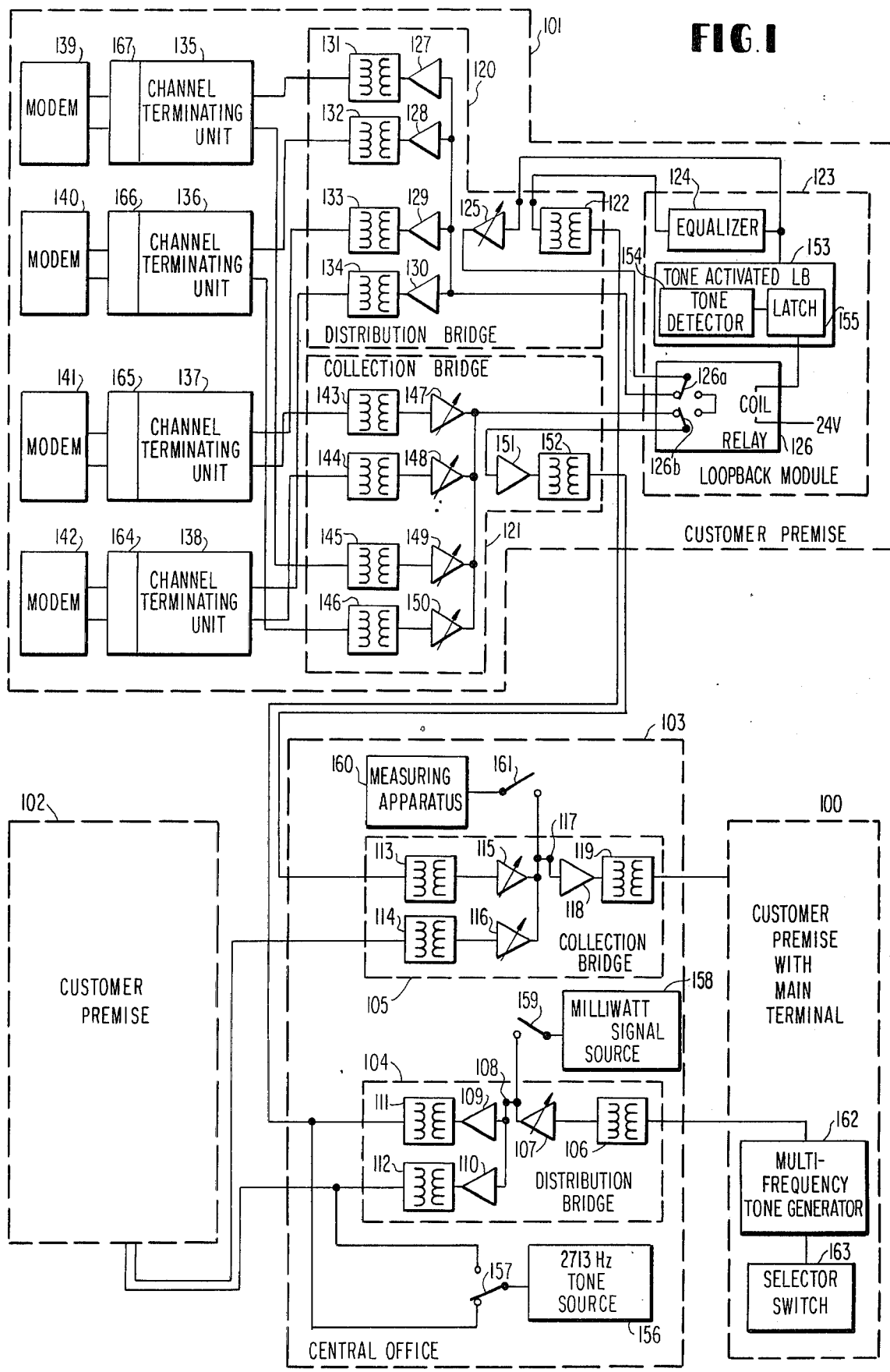
FIG. 1 is a block diagram showing a typical private telephone line system incorporating the present invention.

Referring first to FIG. 1 of the drawings, there is shown a typical private telephone line system providing four-wire service for data transmission or the like between a first customer premise 100 which may be centrally located and one or more remote customer premises 101 and 102, either of which may be unmanned at least part of the time. The private telephone line system includes at least one telephone company central office 103 connected to the first customer premise 100 and the remote customer premises 101 and 102 by respective four-wire lines to provide transmission paths therebetween. In FIG. 1, the four-wire lines are each represented by only two lines, one line depicting the receive pair (tip and ring) and the other line depicting the transmit pair (tip and ring). Designation of the transmit and receive pairs is relative to the location of the observer. In other words, a transmit pair emanating from the telephone company central office is viewed as a receive pair at one of the customer premises and vice versa.

In the specific example illustrated in FIG. 1, there is more than one remote customer premise necessitating at the telephone company central office a distribution bridge 104 and a collection bridge 105. The distribution bridge 104 typically includes an input transformer 106 having its primary winding connected to the receive pair from the customer premise 100. The secondary winding of transformer 106 is connected to the input of an adjustable gain amplifier 107, and while this connection is shown as a direct connection, typically an equalizer (not shown) is interposed between the secondary of transformer 106 and adjustable gain amplifier 107. The output of adjustable gain amplifier 107 is connected through a test point 108 to branching amplifiers 109 and 110. The outputs of amplifiers 109 and 110 are respectively connected to the primary windings of output transformers 111 and 112, the secondary windings of which are connected to the transmit pairs going to the remote customer premises 101 and 102, respectively.

The collection bridge 105 is similar in construction to the distribution bridge and includes input transformers 113 and 114 having their primary windings respectively connected to the receive pairs coming from the customer premises 101 and 102. The secondary windings of transformers 113 and 114 are connected to adjustable gain amplifiers 115 and 116. Again, while this connection is shown as a direct connection, typically equalizers are interposed between the secondary windings of the input transformers 113 and 114 and the input to the adjustable gain amplifiers 115 and 116. The outputs of the adjustable gain amplifiers 115 and 116 are connected through a test point 117 to the input of amplifier 118. The output of amplifier 118 is connected to the primary winding of output transformer 119, the secondary winding of which is connected to the transmit pair going to the customer premise 100.

Turning now to the remote customer premises 101 and 102, it will be assumed that the circuits at these two locations are similar, and, therefore, illustration of the circuits at the customer premise 101 will be taken as exemplary of both. At customer premise 101, the receive pair from the telephone company central office is connected to a distribution bridge 120, while the transmit pair to the telephone company central office emanates from a collection bridge 121. More specifically, the receive pair is connected to the primary winding of input transformer 122, the secondary winding of which is connected to a loop-back module 123. In the loop-back module 123, there is an equalizer 124 which connects the secondary winding of transformer 122 to the input of adjustable gain amplifier 125 in the distribution bridge 120. The output of adjustable gain amplifier 125 is connected via normally closed relay contacts 126a of the loop-back relay 126 to the inputs of branching amplifiers 127-130. The outputs of the branching amplifiers 127-130 are connected to the primary windings of respective output transformers 131-134, the output windings of which are connected to the receive channel inputs of corresponding channel terminating units 135-138. These channel terminating units 135-138 connect respective ones of the modems 139-142 to the distribution bridge 120 and the collection bridge 121 and may include the switching and testing circuit according to the invention. Alternatively, where conventional channel termination units are previously installed, the switching and testing circuits can be installed as separate stand alone units between the channel terminating units and the modems.

The collection bridge 121 is similar in construction to the distribution bridge 120 and comprises input transformers 143-146 having their primary windings connected to the transmit channel outputs of respective ones of the channel terminating units 135-138. The secondary windings of transformers 143-146 are connected to corresponding adjustable gain amplifiers 147-150. The outputs of adjustable gain amplifiers 147-150 are connected in common through normally closed relay contacts 126b to the input of amplifier 151. The output of amplifier 151 is connected to the primary winding of output transformer 152, the secondary winding of which is connected to the transmit pair from the customer premise to the telephone company central office.

The loop-back module 123 is a part of the bridge on the customer premise and permits certain switching and testing procedures to be conducted from the telephone company central office 103. This loop-back module 123 includes tone activated loop-back switching circuitry 153 generally comprising a tone detector 154 which toggles a latch 155. The tone detector 154 receives the same signal from equalizer 124 as is supplied to the input of adjustable gain amplifier 125. When a 2713 Hz tone is detected by the tone detector, an output tone detection signal is produced which toggles latch 155, thereby energizing the coil of the loop-back relay 126. This causes the relay contacts to be switched to establish a connection between the receive pair and the transmit pair of the four-wire line to the customer premise. More specifically, when the relay coil is energized, a circuit is established from input transformer 122, equalizer 124, adjustable gain amplifier 125, relay contacts 126a and 126b, amplifier 151 and output transformer 152. It will be observed that in this connection, adjustable gain amplifier 125 and amplifier 151 function together as a loop-back amplifier. In some loop-back circuits, a separate loop-back amplifier is provided. Upon reception of the next 2713 Hz tone, the tone detector 154 again produces a tone detection signal which causes the latch 155 to be toggled back to its original state, thereby de-energizing the coil of loop-back relay 126 and re-establishing the data channel connections.

The 2713 Hz tone is generated at the telephone company central office 103 by means of a tone source 156. The generated tone may be suitably applied, for example, by means of a switch 157 to a selected one of the transmit pairs from the telephone company central office 103. As just explained, transmission of the first 2713 Hz tone establishes the loop-back condition in the terminating unit of the selected customer premise. The second 2713 Hz tone disconnects the loop and re-establishes the normal data connection. When the loop-back connection is initially established, the 2713 Hz tone may be detected at the test point 117 of collection bridge 105 to provide an initial continuity test of the four-wire line service under test. For more qualitative measurements, a milliwatt test signal source 158 is connected by means of switch 159 to test point 108 of the distribution bridge 104. The milliwatt test signal source provides a precision sinusoidal signal of 1004 Hz which is transmitted through the loop and received at test point 117 of collection bridge 105. Suitable measuring apparatus 160 may be connected by means of switch 161 to the test point 117 for making attenuation, distortion and noise measurements of the four-wire line under test. It will be observed that the tests performed at the telephone company central office necessarily measure the characteristics of the entire loop comprising both the transmit pair and the receive pair. It is not possible with this arrangement to perform a two-wire sine wave return loss test on the four-wire line. In addition, the tests performed from the telephone company central office do not extend beyond the loop-back amplifier (amplifiers 125 and 151 in the illustrated embodiment) in the bridge at the customer premise.

According to the present invention, the switching and testing circuits in the individual channel terminating units 135-138, for example, are provided with addressable tone detecting circuits which are addressable from the central customer premise 100 independent of the telephone company. More specifically, each channel terminating unit may include a tone detector circuit which is programmable to one of several frequencies. In the preferred embodiments of the invention, these frequencies are separated by 100 Hz intervals in the range of about 1000 Hz to about 3000 Hz, 2613 Hz and 2713 Hz not being used because of existing uses in telephone systems. At the central customer premise 100, a multi-frequency tone generator 162 is connected to the transmit pair of the four-wire line. A selector switch 163 connected to the tone generator 162 permits each of the channel terminating units 135-138 to be selectively addressed. It is to be understood, of course, that channel terminating units in the remote customer premise 102 are addressed in exactly the same manner. Items 164, 165, 166 and 167 illustrate the circuit location of a supplemental stand alone product incorporating the described test functions which is utilized when an existing channel terminating unit (135, 136, 137, 138) does not contain these functions.

Figure 2:
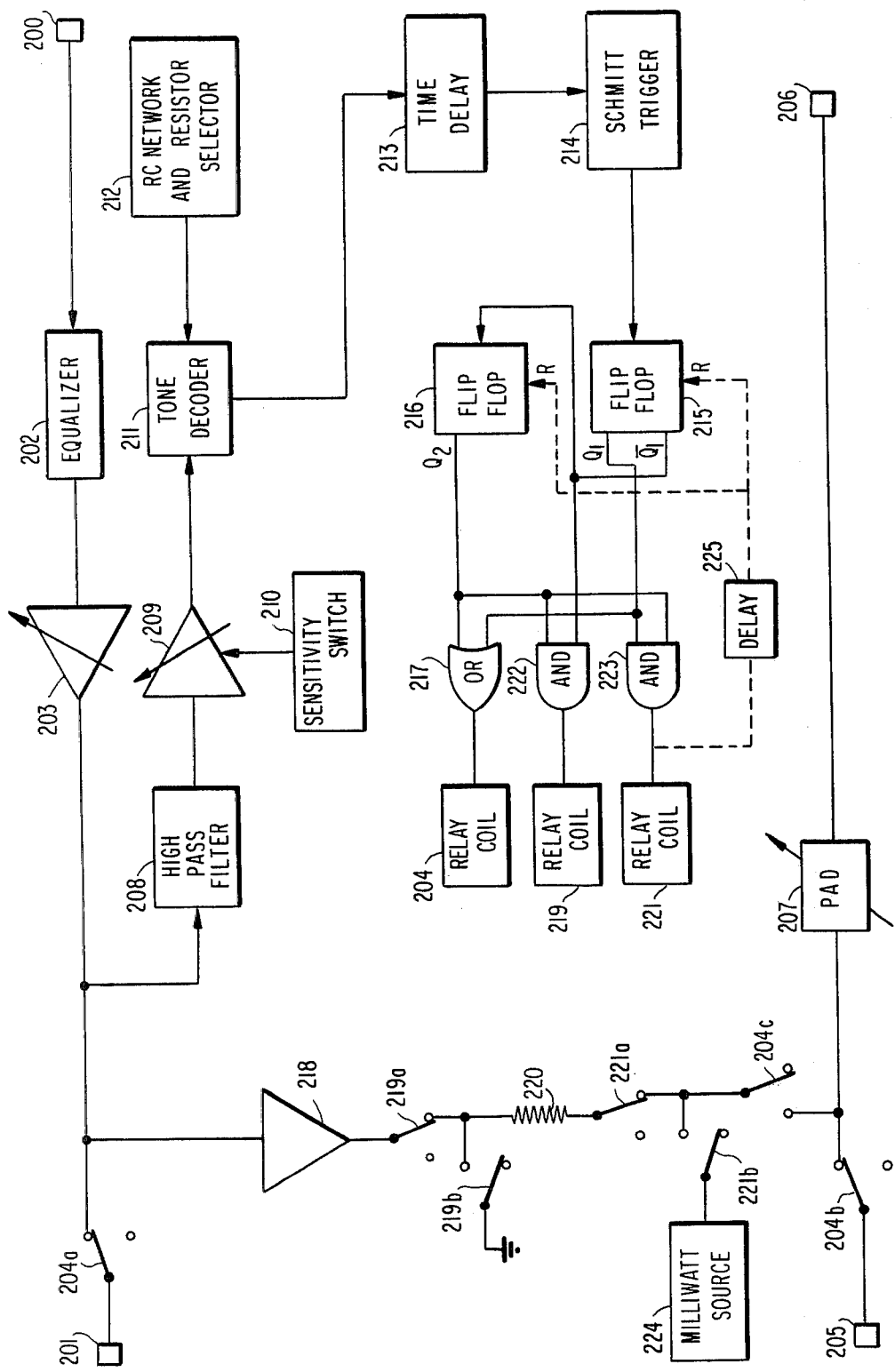
FIG. 2 is a block diagram of a channel terminating unit having a loop-back amplifier, a milliwatt test signal source, and providing data-streaming dropout.

FIG. 2 shows an example of a channel terminating unit according to the invention. The transmit channel of the distribution bridge is connected to the receive input terminal 200, and this terminal is connected through terminal 201 to a corresponding modem by means of an equalizer 202, a receive amplifier 203 and normally closed relay contacts 204a. In a similar manner, the transmit channel from the modem is connected to terminal 205. This terminal is connected to terminal 206 by means of normally closed relay contacts 204b and adjustable pad 207, and terminal 206 is in turn connected to the collection bridge receive input. If the switching and testing circuit according to the invention is installed as a stand alone unit with an existing conventional channel terminating unit, the equalizer 202, receive amplifier 203 and adjustable pad 207 are omitted because these components are part of the conventional channel terminating unit.

The output of amplifier 203 is also connected to a high-pass filter 208 which rejects stray 60 Hz and 120 Hz noise resulting from power lines. The high-pass filter 208 typically has a roll-off below 1000 Hz. The filtered output is connected to the input of amplifier limiter 209, the gain of which may be adjusted by means of a sensitivity switch 210. The output of the amplifier limiter 209 is connected to a tone decoding circuit 211. The tone decoding circuit 211 is a phase-locked loop, the response frequency of which is determined by an RC phase shift network. Preferably, the tone decoding circuit 211 is programmable, with the programming being done on installation at the customer's premise. This is accomplished by means of the RC phase shift network 212 which is provided with a plurality of resistors which can be selectively switched into or out of the network. The output of the tone decoding circuit is connected to a three-second time delay circuit 213. Conventionally, the command tone is applied for a period of five seconds; therefore, the time delay 213 delays operation of the switching circuits for the first three seconds of the command tone. The leading edge of the output from the time delay 213 causes the Schmitt trigger 214 to produce a single output pulse which is supplied to symmetrically triggered bistable multivibrator or flip-flop 215 constituting the first stage of a binary counter. For each input pulse from the Schmitt trigger 214, the flip-flop reverses state. The $\bar{Q}_1$ output of flip-flop 215 is supplied to a second flip-flop 216 constituting the second stage of the binary counter. Both flip-flops 215 and 216 trigger on the leading edge of an input pulse and are normally reset to provide a logic "0" at outputs $Q_1$ and $Q_2$, respectively.

In operation, when a command tone of predetermined frequency is received on the receive side of the channel and detected by the tone decoding circuit 211, an output detection signal is provided to the time delay circuit 213. Three seconds later, this output detection signal is provided to the Schmitt trigger 214, which produces an output pulse on the leading edge of the delayed output detection signal. The output pulse from the Schmitt trigger 214 causes flip-flop 215 to change state so that a logic "1" is supplied at its $Q_1$ output. This logic "1" is supplied through an OR gate 217 to energize relay coil 204. Upon energization of relay coil 204, relay contacts 204a, 204b and 204c switch. This causes both the receive channel and transmit channel connections to the corresponding modem to be disconnected and terminated in a characteristic impedance thereby providing a quiet termination. Simultaneously, a loopback amplifier 218 connected to the output of receive amplifier 203 provides a connection between terminals 200 and 206 by means of normally closed relay contacts 219a and 221a, resistor 220, and normally open relay contacts 204c, which are now closed with the energization of relay coil 204. Relay contacts 219a and 221a are operated by separate relay coils 219 and 221 described in more detail hereinafter.

On receipt of a second command tone, flip-flop 215 again changes state, and the leading edge of the logic "1" from output $\bar{Q}_1$ causes flip-flop 216 to change state for the first time. While the $Q_1$ output is no longer logic "1", the $Q_2$ output now assumes a logic "1" level which is provided to OR gate 217 with the result that relay coil 204 remains energized. Both the $\bar{Q}_1$ output from flip-flop 215 and the $Q_2$ output from flip-flop 216, which are now at the logic "1" level, are supplied to AND gate 222 to energize relay coil 219. Under this condition, the corresponding modem remains disconnected from the data transmission channel and terminated in a characteristic impedance, but loop-back amplifier 218 is disconnected between terminals 200 and 206 due to the opening of relay contacts 219a. In addition, relay contacts 219b are now closed, connecting one end of resistor 220 to ground. This provides a quiet termination for the transmit channel. If the equipment connected to the corresponding modem is malfunctioning, producing a continuous stream of data, that particular equipment will be identified immediately upon the receipt of the first command tone which will disconnect the modem from the transmission channel, resulting in a cessation of the data-streaming. Once the offending channel has been identified, that modem may be maintained in a dropped out condition by sending no further command tones after the second. If this is not the offending channel and it is desired to make further tests and then reestablish the connection of the modem to the data transmission channel, this is simply done by the transmission of a third or fourth command tones.

When the third command tone is detected, flip-flop 215 again changes state, but flip-flop 216 remains in the same state. The outputs $Q_1$ and $Q_2$ are both at logic "1" levels with the result that relay coil 204 remains energized but relay coil 219 is de-energized. The $Q_1$ and $Q_2$ outputs are connected to AND gate 223, thereby energizing relay coil 221. As a result, a milliwatt source 224 is connected to terminal 206 through relay contacts 221b and 204c, which are both now closed. Since relay contacts 221a are now open, resistor 220 is no longer connected to terminal 206.

When the fourth command tone is detected, both flip-flops 215 and 216 change state to resume their respective initial states before the test procedure was started. In other words, the $Q_1$ and $Q_2$ outputs are both at the logic "0" level with the result that relay coils 204 and 221 are now de-energized. Relay coil 219 remains de-energized.

In some applications, the milliwatt source 224 may not be required, in which case relay coil 221 and relay contacts 221a and 221b are simply eliminated. With this modification, when the third command tone is detected, relay coil 204 remains energized and relay coil 219 is de-energized with the result that loop-back amplifier 28 again connects terminal 200 to terminal 206 so that the command tone is returned on the transmit side of the channel. This occurs for only a short time, however, as the output of AND gate 223 is connected in this modification through a delay circuit 225 to the reset inputs of flip-flops 215 and 216. Thus, after for example a one-second delay, the flip-flops 215 and 216 are reset so that both relay coils 204 and 219 are again de-energized. The operation of the channel terminating unit shown in FIG. 2 is summarized in Tables 1 and 2 below, wherein the letters "D" and "E" denote de-energized and energized states, respectively, of the relays.

While the preferred embodiments of the invention have been described in terms of multi-channel circuits at the remote customer premise requiring programmed tone decoding circuits in each of the channel terminating units, those skilled in the art will recognize that the preferred embodiments may be equally well applied to single-channel systems with resulting simplification of the tone generator at the central customer premise. Therefore, it will be understood that the preferred embodiments are presented herein by way of example only, and other variations and modifications of the invention may be practiced within the scope of the appended claims.

TABLE 1

| | | FLIP-FLOP 215 | | FLIP-FLOP 216 | | RELAY COILS | | |
|---|---|---|---|---|---|---|---|---|
| TONE APPLICATION | MODE | $\bar{Q}_1$ | $Q_1$ | $\bar{Q}_2$ | $Q_2$ | 204 | 219 | 221 |
| | In Data | 1 | 0 | 1 | 0 | D | D | D |
| 1st | Loop-Back | 0 | 1 | 1 | 0 | E | D | D |
| 2d | Quiet Termination | 1 | 0 | 0 | 1 | E | E | D |
| 3rd | XMIT Milliwatt Source | 0 | 1 | 0 | 1 | E | D | E |
| 4th | In Data | 1 | 0 | 1 | 0 | D | D | D |

Loop-Back, Data Streaming Dropout, Milliwatt Test Signal Source Sequence

TABLE 2

Loop-Back and Data Streaming Dropout Sequence

| | In Data | 1 | 0 | 1 | 0 | D | D | — |
|---|---|---|---|---|---|---|---|---|
| 1st | Loop-Back | 0 | 1 | 1 | 0 | E | D | — |
| 2d | Quiet Termination | 1 | 0 | 0 | 1 | E | E | — |
| 3rd | Loop-Back* (1 second) | 0 | 1 | 0 | 1 | E | D | — |
| after 1 second | In Data | 1 | 0 | 1 | 0 | D | D | — |

*One second loop-back verifies return to In Data mode.

We claim:

1. A remote telephone line switching and testing circuit for a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, said remote telephone line switching and testing circuit comprising:

tone detecting means adapted to be connected to the two wires used for reception at said second remote location and responsive to tones of a predetermined frequency for providing output detection signals;

control means responsive to the output detection signals from said tone detecting means for generating first and second control signals in response to successive output detection signals; and switching means responsive to said first control signal for disconnecting the equipment at said second location from the four-wire line and providing a quiet termination for each of the two wires used for reception and the two wires used for transmission which are disconnected from said equipment, said switching means further being responsive to said second control signal for reconnecting the equipment at said second location to the four-wire line.

2. A remote telephone line switching and testing circuit for a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, said remote telephone line switching and testing circuit comprising:

tone detecting means adapted to be connected to the two wires used for reception at said second remote location and responsive to tones of a predetermined frequency for providing output detection signals;

control means responsive to the output detection signals from said tone detecting means for generating first and second control signals in response to successive output detection signals;

a milliwatt test signal source, and switching means responsive to said first control signal for disconnecting the equipment at said second location from at least the two wires used for transmission and connecting said milliwatt test signal source to said two wires used for transmission, said switching means further being responsive to said second control signal for disconnecting said milliwatt test signal source from said two wires and reconnecting the equipment at said second location to said two wires used for transmission.

3. A remote telephone line switching and testing circuit for a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, said remote telephone line switching and testing circuit comprising:

tone detecting means adapted to be connected to the two wires used for reception at said second remote location and responsive to tones of a predetermined frequency for providing output detection signals;

sequencing means responsive to the output detection signals of said tone detecting means for counting the number of occurrences of said output detection signals and providing count outputs for each number counted;

a loop-back amplifier; and switching means responsive to a first count output from said sequencing means for disconnecting the equipment at said second location from the four-wire line and connecting said loop-back amplifier between the two wires used for reception and the two wires used for transmission, said switching means being responsive to a second count output from said sequencing means for disconnecting said loop-back amplifier and providing a quiet termination for each of the two wires used for reception and the two wires used for transmission, said switching means further being responsive to a third count output from said sequencing means for briefly reconnecting said loop-back amplifier between said two wires used for reception and said two wires used for transmission and thereafter disconnecting said loop-back amplifier and reconnecting the equipment at said second location to the four-wire line.

4. A remote telephone line switching and testing circuit for a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, said remote telephone lines switching and testing circuit comprising:

tone detecting means adapted to be connected to the two wires used for reception at said second remote location and responsive to tones of a predetermined frequency for providing output detection signals;

sequencing means responsive to the output detection signals from said tone detecting means for counting the number of occurrences of said output detection signals and providing count outputs for each number counted;

a loop-back amplifier;

a milliwatt test signal source; and switching means responsive to a first count output from said sequencing means for disconnecting the equipment at said second location from the four-wire line and connecting said loop-back amplifier between the two wires used for reception and the two wires used for transmission, said switching means being responsive to a second count output from said sequencing means for disconnecting said loop-back amplifier and providing a quiet termination for each of the two wires used for reception and the two wires used for transmission, said switching means being responsive to a third count output from said sequencing means for connecting said milliwatt test signal source to said two wires for transmission, said switching means further being responsive to a fourth count output from said sequencing means for disconnecting said milliwatt test signal source and reconnecting the equipment at said second location to the four-wire line.

5. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the improvement comprising:

a tone generator connected to the two wires used for transmission at said first location; and a switching and testing circuit at said at least second remote location, said switching and testing circuit comprising:

tone detecting means connected to the two wires used for reception at said second remote location and responsive to said tones of predetermined frequency for providing output detection signals;

control means responsive to the output detection signals of said tone detecting means for generating first and second control signals in response to successive output detection signals; and switching means responsive to said first control signal for disconnecting the equipment at said second location from the four-wire line and providing a quiet termination for each of the two wires used for reception and the two wires used for transmission which are disconnected from said equipment, said switching means further being responsive to said second control signal for reconnecting the equipment at said second location to the four-wire line.

6. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the improvement comprising:

a tone generator connected to the two wires for transmission at said first location for generating a tone of a predetermined frequency; and a switching and testing circuit at said at least second remote location, said switching and testing circuit comprising:

tone detecting means connected to the two wires used for reception at said second remote location and responsive to tones of said predetermined frequency for providing output detection signals;

control means responsive to the output detection signals of said tone detecting means for generating first and second control signals in response to successive output detection signals;

a milliwatt test signal source; and switching means responsive to said first control signal for disconnecting the equipment at said second location from at least the two wires used for transmission and connecting said milliwatt test signal source to said two wires used for transmission, said switching means further being responsive to said second control signal for disconnecting said milliwatt test signal source and reconnecting the equipment at said second location to said two wires used for transmission.

7. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the improvement comprising:

a tone generator connected to the two wires for transmission at said first location for generating tones of a predetermined frequency; and a switching and testing circuit at said at least second remote location, said switching and testing circuit comprising:

tone detecting means connected to the two wires used for reception at said second remote location and responsive to tones of said predetermined frequency for providing output detection signals;

sequencing means responsive to the output detection signals from said tone detecting means for counting the number of occurrences of said output detection signals and providing count outputs for each number counted;

a loop-back amplifier; and switching means responsive to a first count output from said sequencing means for disconnecting the equipment at said second location from the four-wire line and connecting said loop-back amplifier between the two wires used for reception and the two wires used for transmission, said switching means being responsive to a second count output from said sequencing means for disconnecting said loop-back amplifier and providing a quiet termination for each of the two wires used for reception and the two wires used for transmission, said switching means further being responsive to a third count output from said sequencing means for briefly reconnecting said loop-back amplifier between the two wires used for reception and the two wires used for transmission and thereafter disconnecting said loop-back amplifier and reconnecting the equipment at said second location to the four-wire line.

8. In a four-wire communication system of the type wherein two wires are used for transmission and two wires are used for reception, said system providing communication between equipment at a first location and equipment at at least a second remote location and including a central office connected to said first location and said at least second remote location by respective four-wire line and providing a communication path therebetween, the improvement comprising:

a tone generator connected to the two wires for transmission at said first location for generating tones of a predetermined frequency; and a switching and testing circuit at said at least second remote location, said switching and testing circuit comprising:

tone detecting means connected to the two wires used for reception at said second remote location and responsive to tones of said predetermined frequency for providing output detection signals;

sequencing means responsive to the output detection signals of said tone detecting means for counting the number of occurrences of said output detection signals and providing count outputs for each number counted;

a loop-back amplifier;

a milliwatt test signal source; and switching means responsive to a first count output from said sequencing means for disconnecting the equipment at said second location from the four-wire line and connecting said loop-back amplifier between the two wires used for reception and the two wires used for transmission, said switching means being responsive to a second count output from said sequencing means for disconnecting said loop-back amplifier and providing a quiet termination for each of the two wires used for reception and the two wires used for transmission, said switching means being responsive to a third count output from said sequencing means for connecting said milliwatt test signal source to the two wires used for transmission, said switching means further being responsive to a fourth count output from said sequencing means for disconnecting said milliwatt test signal source and reconnecting the equipment at said second location to the four-wire line.

9. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the equipment at said second remote location including a plurality of modems connected to the four-wire line by a distribution bridge and a collection bridge, said distribution bridge being connected to the two wires for reception and branching the same to a plurality of receive channels each connected to a respective one of said modems, and said collection bridge collecting a like plurality of transmit channels connected to respective ones of said modems for connection to the two wires for transmission, the improvement comprising a plurality of switching and testing circuits, one connected to each receive channel and transmit channel of a corresponding modem, each of said switching and testing circuits comprising:

tone detecting means connected to the receive channel and responsive to tones of one of a plurality of predetermined frequencies for providing output detection signals, each of said plurality of predetermined frequencies being assigned to one of said plurality of switching and testing circuits;

control means responsive to the output detection signals from said tone detecting means for generating first and second control signals in responsive to successive output detection signals; and switching means responsive to said first control signal for disconnecting the corresponding modem at said second location from the receive and transmit channels and providing a quiet termination for said receive and transmit channels which are disconnected from said modem, said switching means further being responsive to said second control signal for reconnecting said modem to said receive and transmit channels.

10. The improvement in a four-wire communication system as recited in claim 9, further comprising a selectable tone generator connected to the two wires for transmission at said first location for selectively generating a tone of one of said plurality of predetermined frequencies.

11. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the equipment at said second remote location including a plurality of modems connected to the four-wire line by a distribution bridge and a collection bridge, said distribution bridge being connected to the two wires for reception and branching the same to a plurality of receive channels each connected to a respective one of said modems, and said collection bridge collecting a like plurality of transmit channels connected to respective ones of said modems for connection to the two wires for transmission, the improvement comprising a plurality of switching and testing circuits, one connected to each receive channel and transmit channel of a corresponding modem, each of said switching and testing circuits comprising:

tone detecting means connected to the receive channel and responsive to tones of one of a plurality of predetermined frequencies for providing output detection signals, each of said plurality of predetermined frequencies being assigned to one of said plurality of switching and testing circuits;

control means responsive to the output detection signals from said tone detecting means for generating first and second control signals in responsive to successive output detection signals;

a milliwatt test signal source; and switching means responsive to said first control signal for disconnecting the corresponding modem from at least said transmit channel and connecting said milliwatt test signal source to said transmit channel, said switching means further being responsive to said second control signal for disconnecting said milliwatt test signal source and reconnecting said modem to said transmit channel.

12. The improvement in a four-wire communication system as recited in claim 11, further comprising a selectable tone generator connected to the two wires for transmission at said first location for selectively generating a tone of one of said plurality of predetermined frequencies.

13. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the equipment at said second remote location including a plurality of modems connected to the four-wire line by a distribution bridge and a collection bridge, said distribution bridge being connected to the two wires for reception and branching the same to a plurality of receive channels each connected to a respective one of said modems, and said collection bridge collecting a like plurality of transmit channels connected to respective ones of said modems for connection to the two wires for transmission, the improvement comprising a plurality of switching and testing circuits, one connected to each receive channel and transmit channels of a corresponding modem, each of said switching and testing circuits comprising:

tone detecting means connected to the receive channel and responsive to tones of one of a plurality of predetermined frequencies for providing output detection signals, each of said plurality of predetermined frequencies being assigned to one of said plurality of switching and testing circuits;

sequencing means responsive to the output detection signals of said tone detecting means for counting the number of occurrences of said output detection signals and providing count outputs for each number counted;

a loop-back amplifier; and switching means responsive to a first count output from said sequencing means for disconnecting the corresponding modem from the receive channel and the transmit channel and connecting said loop-back amplifier between said receive channel and said transmit channel, said switching means being responsive to a second count output from said sequencing means for disconnecting said loop-back amplifier and providing a quiet termination for each of said received channel and said transmit channel, said switching means further being responsive to a third count output from said sequencing means for briefly reconnecting said loop-back amplifier between said received channel and said transmit channel and thereafter disconnecting said loop-back amplifier and reconnecting the corresponding modem to said receive channel and said transmit channel.

14. The improvement in a four-wire communication system as recited in claim 13, further comprising a selectable tone generator connected to the two wires for transmission at said first location for selectively generating a tone of one of said plurality of predetermined frequencies.

15. In a four-wire communication system of the type wherein two wires are used for transmission and two wires are used for reception, said system providing communication between equipment at a first location and equipment at at least a second remote location and including a central office connected to said first location and said at least second remote location by respective four-wire lines and providing a communication path therebetween, the equipment at said second remote location including a plurality of modems connected to the four-wire line by a distribution bridge and a collection bridge, said distribution bridge being connected to the two wires for reception and branching the same to a plurality of receive channels each connected to a respective one of said modems, and said collection bridge collecting a like plurality of transmit channels connected to respective ones of said modems for connection to the two wires for transmission, the improvement comprising a plurality of switching and testing circuits, one connected to each receive channel and transmit channels of a corresponding modem, each of said switching and testing circuit comprising:

tone detecting means connected to the receive channel and responsive to tones of one of a plurality of predetermined frequencies for providing output detection signals, each of said plurality of predetermined frequencies being assigned to one of said plurality of switching and testing circuits;

sequencing means responsive to the output detection signals of said tone detecting means for counting the number of occurrences of said output detection signals and providing count outputs for each number counted;

a loop-back amplifier;

a milliwatt test signal source; and switching means responsive to a first count output of said sequencing means for disconnecting the corresponding modem from the receive channel and the transmit channel and connecting said loop-back amplifier between said receive channel and said transmit channel, said switching means being responsive to a second count output from said sequencing means for disconnecting said loop-back amplifier and providing a quiet termination for each of said receive channel and said transmit channel, said switching means being responsive to a third count output from said sequencing means for connecting said milliwatt test signal source to said transmit channel, said switching means further being responsive to a fourth count output from said sequencing means for disconnecting said milliwatt test signal source and reconnecting the corresponding modem to said receive channel and said transmit channel.

16. The improvement in a four-wire communication system as recited in claim 15, further comprising a selectable tone generator connected to the two wires for transmission at said first location for selectively generating a tone of one of said plurality of predetermined frequencies.

* * * * *